(No Model.)
A. V. KISER.
RUBBER TIRE.
No. 605,881. Patented June 21, 1898.
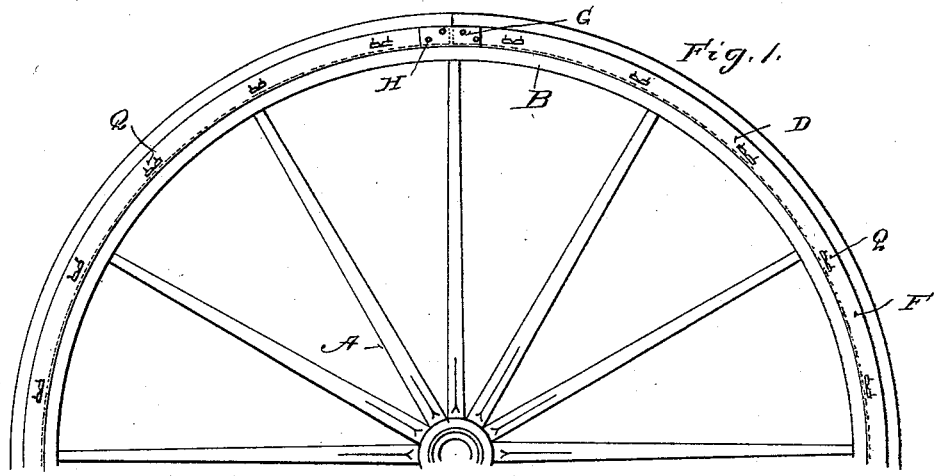
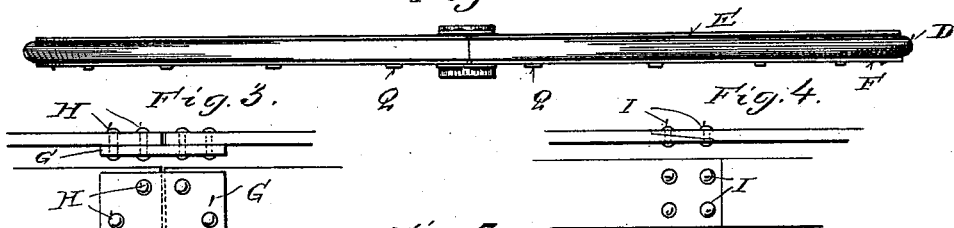
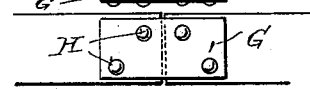 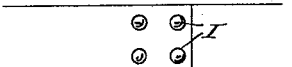
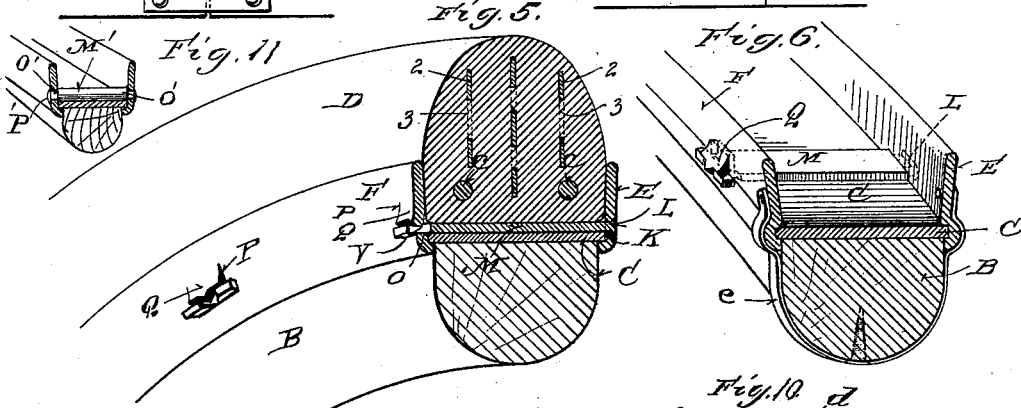
Witnesses
Jas. C. Dawley
W. M. McNair
Inventor
Alva V. Kiser,
By his Attorney
H. A. Toulmin

UNITED STATES PATENT OFFICE.

ALVIE V. KISER, OF SPRINGFIELD, OHIO.

RUBBER TIRE.

SPECIFICATION forming part of Letters Patent No. 605,881, dated June 21, 1898.

Application filed June 4, 1897. Serial No. 639,390. (No model.)

*To all whom it may concern:*

Be it known that I, ALVIE V. KISER, a citizen of the United States, residing at Springfield, in the county of Clark and State of Ohio, have invented certain new and useful Improvements in Rubber-Tire Attachments for Vehicle-Wheels, of which the following is a specification, reference being had therein to the accompanying drawings.

This invention relates to certain new and useful improvements in rubber-tire attachments for vehicle-wheels.

The particular object of my invention is to provide an improved type of means for attaching rubber tires to ordinary wheels in a quick and easy manner and without the use of special machinery.

With this end in view my invention consists, essentially, of two bands or cheek-pieces adapted to embrace the edge of the ordinary iron tire on vehicle-wheels and to receive and hold between them the rubber tire and keys by which these bands or cheek-pieces are connected together and held in engagement with the ordinary iron tire and against the rubber tire, said keys being placed outside of the ordinary iron tire in order not to require boring the wooden felly at all.

Another feature of my invention consists in connecting the meeting ends of the rings or cheek-pieces by overlapping the ends on each other or by lapping a separate plate over the ends.

In the accompanying drawings, on which like reference-letters indicate corresponding parts, Figure 1 is a side elevation of a portion of a vehicle-wheel with my improvements applied thereto; Fig. 2, an edge view of such wheel and improvements; Fig. 3, edge and side views of one form of connecting the ends of the rings or cheek-pieces; Fig. 4, edge and side views of another form of connecting such parts; Fig. 5, an enlarged perspective sectional view showing my improvements applied to a wheel-rim and ordinary tire; Fig. 6, a perspective view of the same parts with the rubber tire removed; Fig. 7, a perspective sectional view of a part of one of the rings or cheek-pieces; Fig. 8, a detail perspective view of the preferred form of key on an enlarged scale; Fig. 9, a transverse sectional view showing a modified form of key; Fig. 10, a section and elevation showing the means for connecting the ends of the retaining-wire used in the rubber tire, and Fig. 11 a sectional view showing a modified form of key.

The letter A designates a portion of a vehicle-wheel of any improved kind or type having the usual wooden felly B and an ordinary iron tire C, extended slightly beyond the sides of the felly, as is usual. On this ordinary iron tire I place a rubber tire D, of any desired contour in cross-section, of which the art affords many illustrations, and this rubber tire I secure, aside from certain retaining-wires to be hereinafter referred to, by means of two rings or cheek-pieces E and F, which are arranged to engage with the projecting edges of the ordinary iron tire C, as shown in several of the figures. These rings or cheek-pieces extend around the entire circle of the wheel and have their ends connected in either of the manners shown in Figs. 3 and 4. I contemplate forming these rings or cheek-pieces of given length for various-sized wheels within certain ranges, and to adapt them to such various sizes I provide a plate G and lap it over the meeting ends and secure it by rivets or bolts H. This plate I use when the wheel is just large enough to bring the ends of the ring or cheek-piece together or is too large for them to reach each other. When, however, the wheel is a little smaller than this, I overlap the ends of the ring or cheek-piece and secure such ends by rivets or bolts I, as seen in Fig. 4, the ends being chamfered or beveled to prevent making the joint rather thick. It is also contemplated that these bands or rings and cheek-pieces will be carried in stock by hardware-merchants or carriage-dealers and that some of them will be perforated, as shown in Fig. 3, and accompanied by plates G, while others will be beveled and perforated, as shown in Fig. 4. In this way customers can get rings or cheek-pieces to fit various-sized wheels.

To secure the rings or cheek-pieces to the wheel and prevent them from becoming disengaged from the ordinary iron tire, I perforate the same at suitable intervals. The ring or cheek-piece E has a rectangular perforation K to receive the tenon L of a flat key M, which tenon is stuck up or riveted at its end, as shown in Figs. 5 and 6, so as to secure such cheek-piece firmly to such key. The other ring or cheek-piece has a rectangular perforation O and is slitted, as seen at P, so as to leave a tongue Q with a tooth R. The end of the key which fits in the perforation O is notched, as shown at S, so as to leave an intervening neck T left with projections U at its end and longitudinally slit, as shown at V. When this key is passed through the perforation O, the lug Q being first sprung out, as shown more clearly in Figs. 5 and 6, the projections U are spread apart by placing a pointed instrument, as a cold-chisel, in the slit V. This spreads the neck T until it binds laterally against the walls of the perforation O. Then the lug Q is driven partially back and the tooth R forced down into the space formed by having spread the parts at the slit V.

The extent that the key projects beyond the ring or cheek-piece F is slight, and, being held and also protected by the lug Q, a strong and practical connection is made by means of the keys M between the two rings or cheek-pieces. It will be seen also that the keys being shouldered the structure becomes rigid and strong, the rings or cheek-pieces being firmly bound and held to the wheel by their connection with the ordinary iron tire and their interconnection by means of these keys.

To remove the rubber tire for repairs or to put on a new one, it is merely necessary to spring the lugs Q outward enough to take the teeth R out of the slit V, so that it can be closed up and the ring or cheek-piece F then removed from the keys.

Referring now to the retaining-wires for the rubber tire, these are shown at c. The two ends of each wire are screw-threaded, one with a left-hand and the other with a right-hand thread, as seen at Fig. 10, and on these ends is screwed a coupling-sleeve d, likewise right and left hand screw-threaded. The two meeting ends of the rubber tire are pushed back and held while these coupling-sleeves are being screwed onto the ends of the retaining-wires. The tension which can thus be put upon the wires holds the rubber tire from the possibility of moving radially from the wheel, while the rings or cheek-pieces hold it laterally and fit up as snugly to it as is the case with the ordinary channel-iron tire for rubber tires.

Thus it will be seen that I have provided a tire attachment capable of being made and sold as an attachment and put upon wheels without the use of special machinery and, indeed, by dealers in hardware or carriages, the tires and retaining-wires being sold as a part of the equipment.

At e I have shown a plate secured to the felly and to the rim or cheek-pieces to prevent the possibility of the "creeping" of the cheek-pieces on the tire. This plate I may or may not use.

In Fig. 11 I illustrate a modified form of key, being in the nature of a rivet M', shouldered at O', with a projection or tenon P', which extends through the ring or cheek-piece and is struck up or riveted at the end. In this form I rivet both ends of the fastening device, whereas in the other form I rivet but one end. At 2 I show several strips of fabric or other strong material, which pass longitudinally through the rubber tire and are perforated at intervals, so that the rubber will pass through these strips. These holes will vary in size from a distinct hole, as shown at 3, down to the mere size of the interstices in the fabric. The strips are placed in the mold and the rubber molded over them. Their function is to prevent the rubber from cutting—that is, from giving to such an extent as to tear or split. This action of preventing the rubber from tearing is true as to both tensile and sidewise distortion of the rubber.

Having thus fully described my invention, what I claim as new, and desire to secure by Letters Patent, is—

1. In a rubber-tire attachment for vehicle-wheels, the combination with two rings or cheek-pieces adapted to engage with the ordinary iron tire of a wheel, of keys or rivets insertible in perforations in said rings or cheek-pieces and at one end riveted to one of said cheek-pieces and at their other end spread apart to engage with the other cheek-piece, and having shoulders between said cheek-pieces and engaging therewith respectively.

2. In a rubber-tire attachment for vehicle-wheels, the combination with rings or cheek-pieces adapted to engage with the ordinary iron tire and having perforations and plates secured to the rings or cheek-pieces to hold their ends together, of rings or keys in said perforations and having shoulders engaging the inner faces of said rings or cheek-pieces respectively, and also engaging their outer faces, a rubber tire fitted between said rings or cheek-pieces, one or more retaining-wires extending through said rubber tire and fastened at their ends.

3. In a rubber-tire attachment for vehicle-wheels, the combination with the rings or cheek-pieces adapted to engage with the ordinary iron tire and having perforations, of keys adapted to pass through said perforations and at one end to be riveted to one ring or cheek-piece and at the other end to be spread to interlock with the other ring or cheek-piece, and means to hold the same spread.

4. In a rubber-tire attachment for vehicle-wheels, the combination with rings or cheek-pieces adapted to engage with the ordinary iron tire, one of them having plain perforations and the other having perforations with a struck-up lug, of keys insertible through said perforations and adapted to be riveted at one end to one ring or cheek-piece and slitted at the other end and having a neck adapted to be spread to bind the same in the adjacent perforations and being held and protected by said lug.

5. In a rubber-tire attachment for vehicle-wheels, the combination with rings or cheek-pieces adapted to be connected at their ends, and having perforations, those of one ring or cheek-piece having struck-up lugs, of keys adapted to fit in said perforations and to be riveted at one end and spread at the other end and held and protected by said lug at the latter end.

6. In a rubber-tire attachment for vehicle-wheels, the combination with a ring or cheek-piece having perforations with a struck-up lug having a tooth, of a key having a neck with a slit, shoulders at one end of the neck and projections at the other, the neck being spreadable to receive said tooth in the slit.

In testimony whereof I affix my signature in presence of two witnesses.

ALVIE V. KISER.

Witnesses:
OLIVER H. MILLER,
WARREN M. MCNAIR.